INVENTOR.
JAMES H. McAULEY
BY
MAHONEY, MILLER & RAMBO
BY Wm. V. Miller
ATTORNEYS

United States Patent Office 3,451,528
Patented June 24, 1969

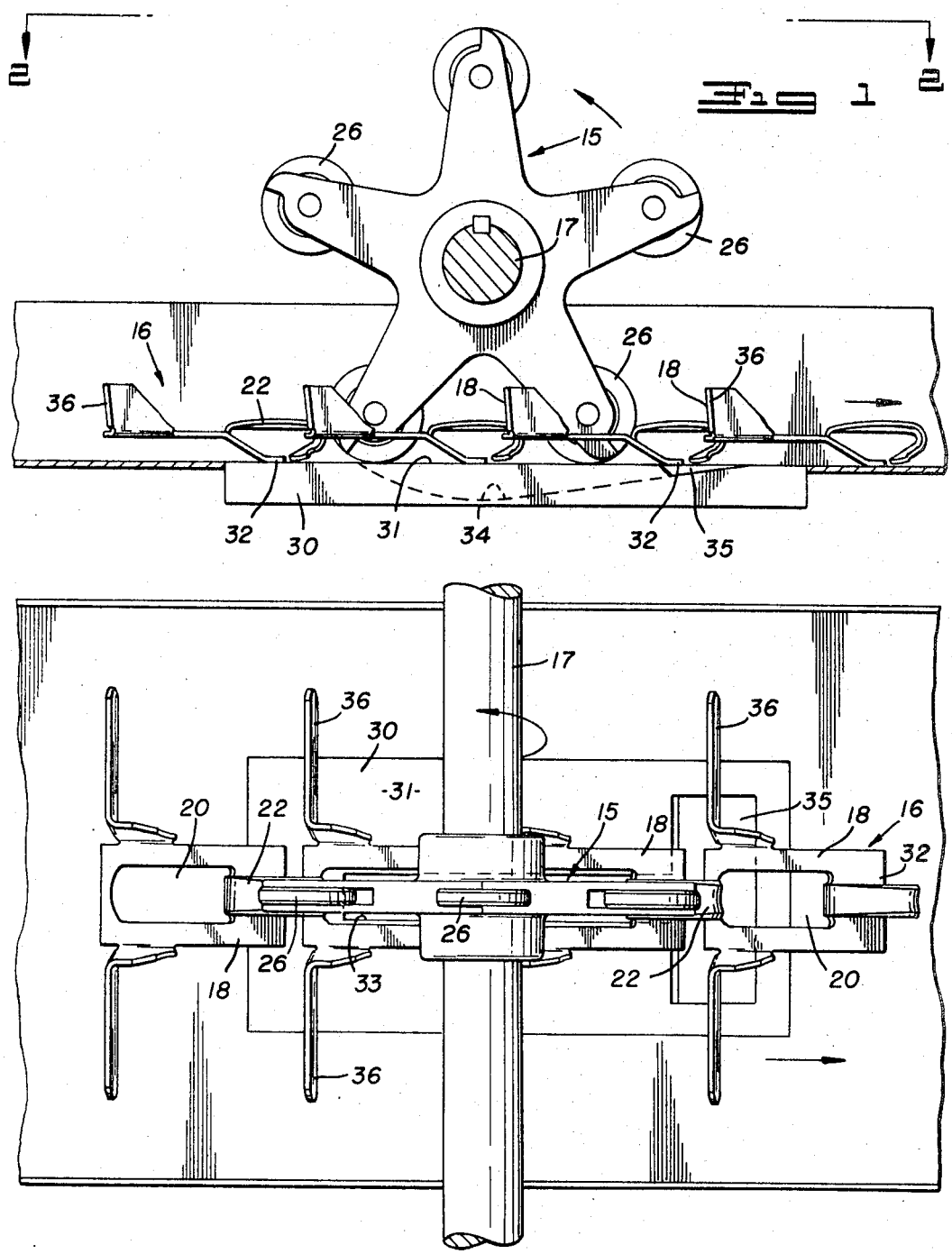

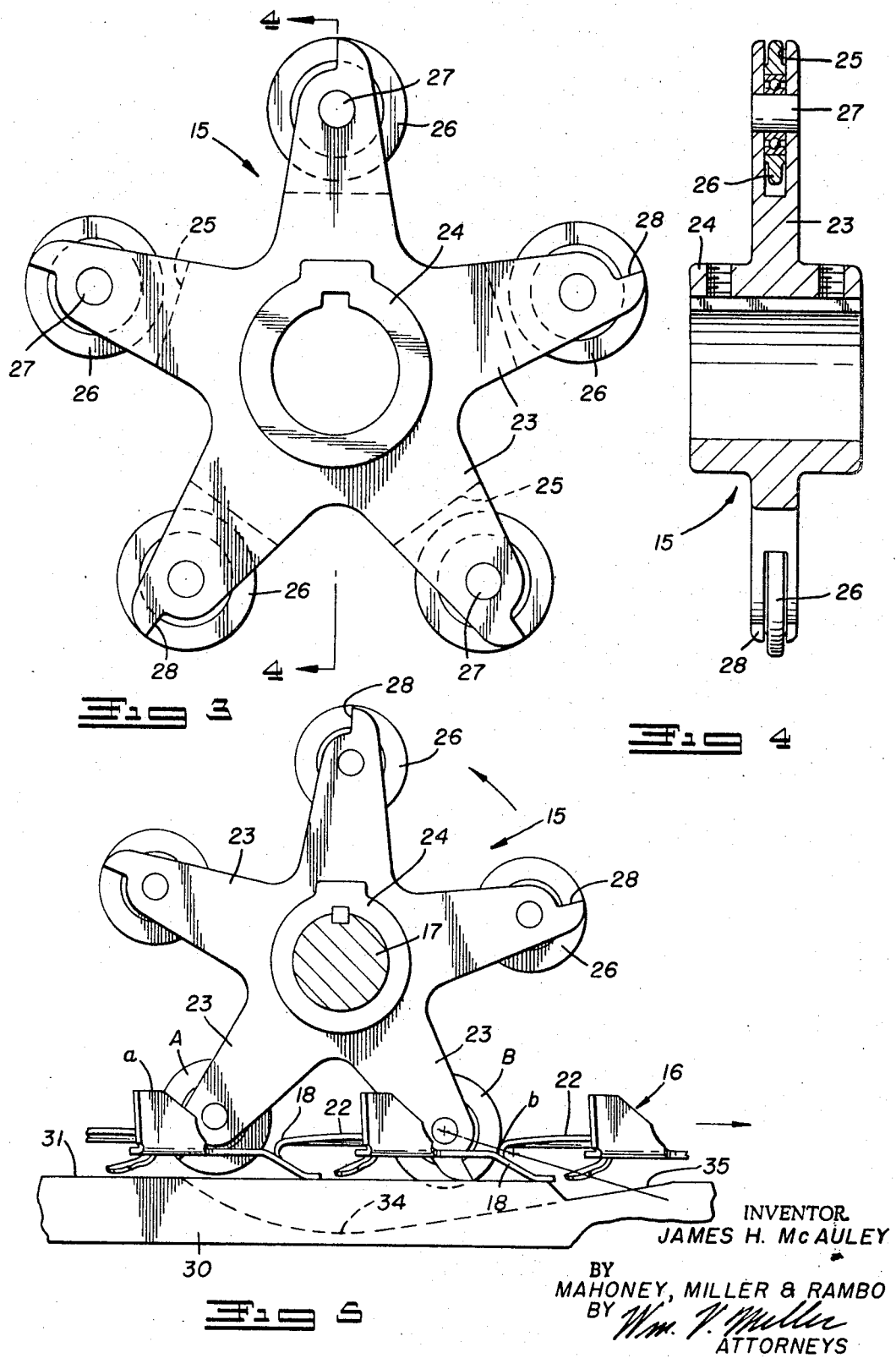

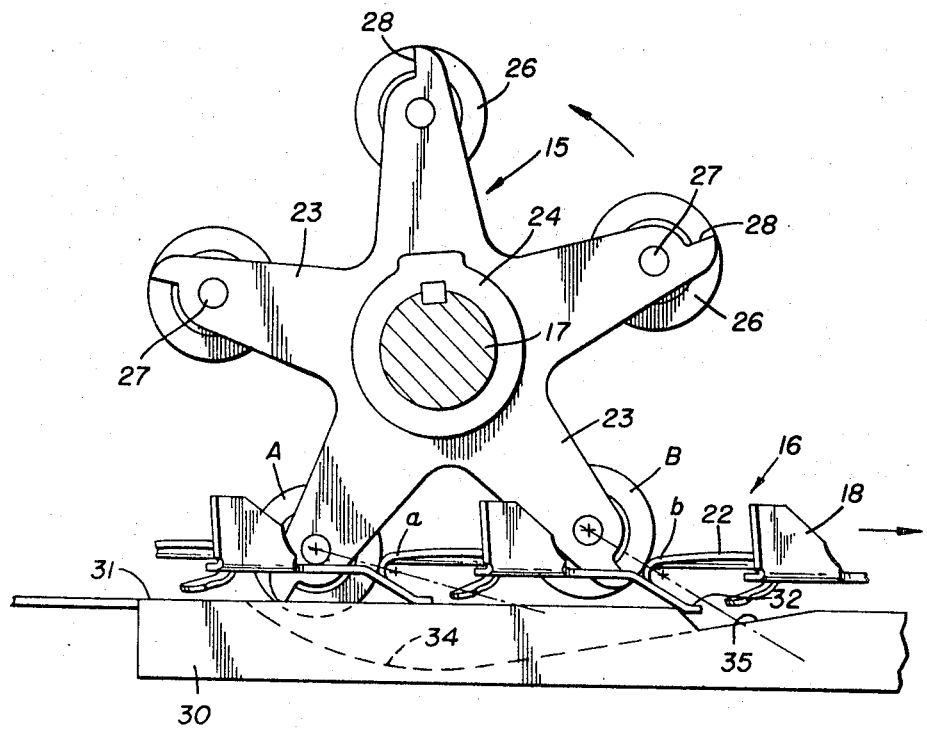
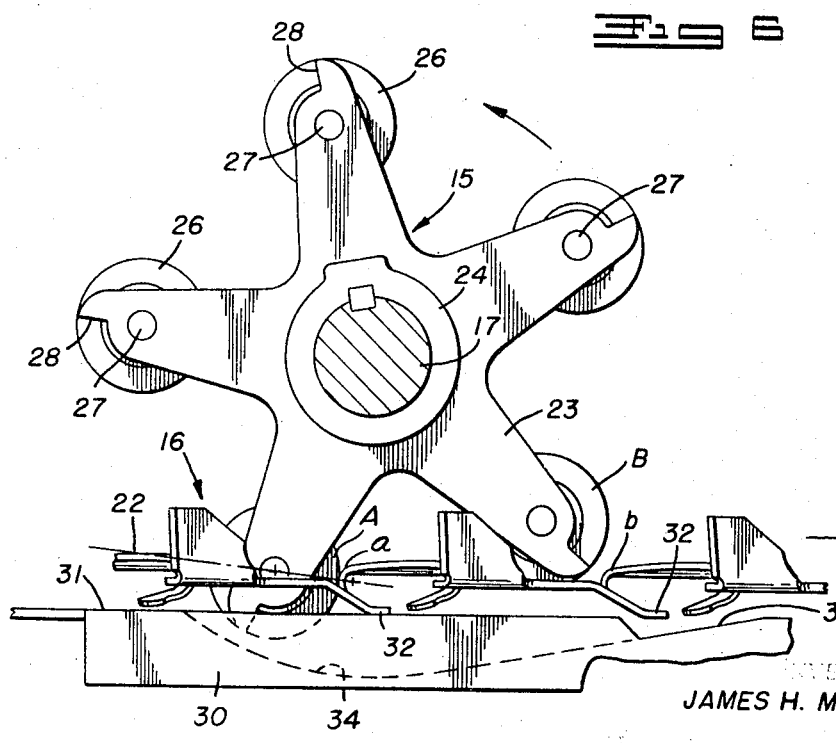

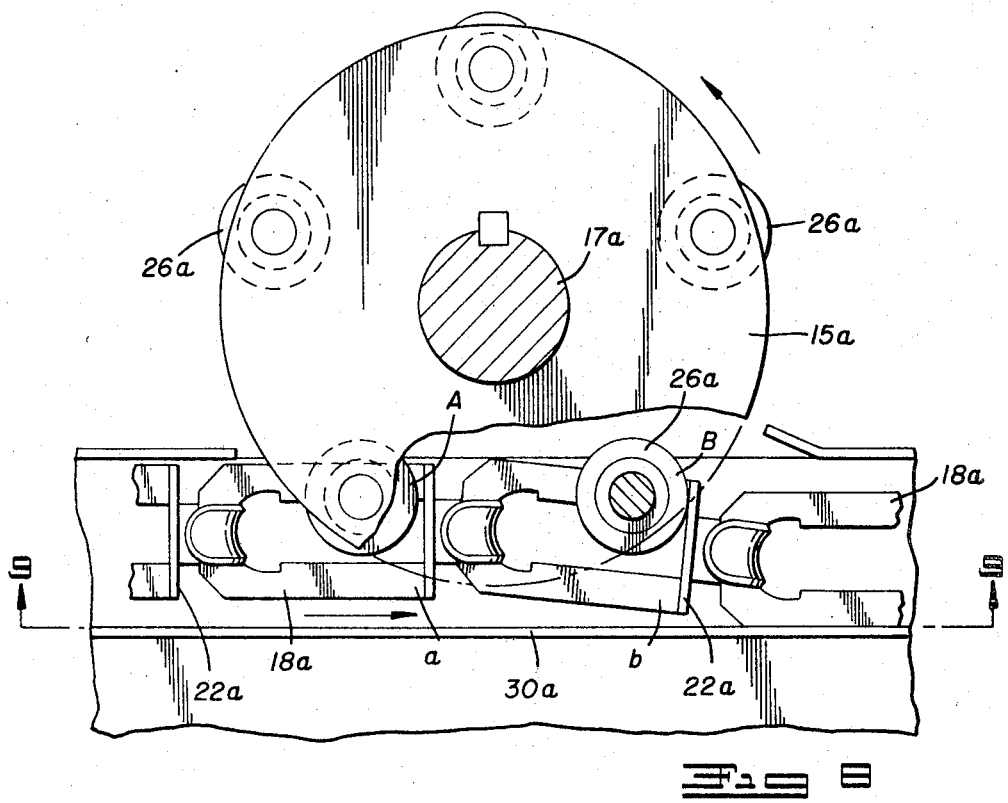
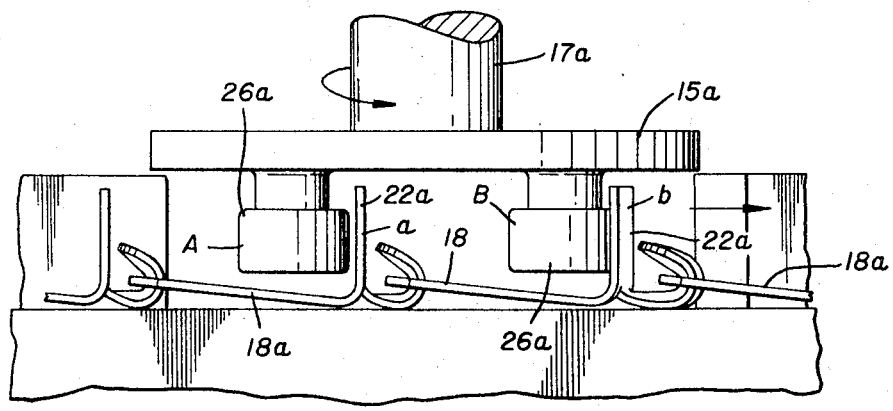

3,451,528
STRAIGHT-THROUGH SPROCKET DRIVE FOR
OPEN-LINK LONG PITCH CHAIN
James H. McAuley, Bremen, Ohio, assignor to McAuley
Manufacturing, Inc., Bremen, Ohio, a corporation of
Ohio
Filed Oct. 6, 1967, Ser. No. 673,332
Int. Cl. B65g 35/06
U.S. Cl. 198—171      4 Claims

ABSTRACT OF THE DISCLOSURE

A special sprocket drive for interlocking open-link flexible chain of the general type disclosed in Patents Nos. 2,672,059, 2,889,915, 3,215,256, and 3,262,546–8; or in the copending applications Ser. No. 630,049, filed Apr. 11, 1967, and the application filed simultaneously herewith. Drive of this type of chain is by a sprocket which engages the chain tangentially and in which the chain does not pass around the sprocket but passes straight through or in a straight line longitudinally of the sprocket with successive single sprocket teeth engaging the chain to apply the driving force. According to the present invention, the sprocket is provided with anti-friction driving rollers which successively engage the succeeding links to apply the driving force with the development of a minimum of force on the sprocket and of friction between the sprocket and chain as a result of the driving engagement together with an opposed bearing shoe which prevents excessive distortion of the chain as a result of the radial force developed thereon.

PRIOR ART AND OBJECT OF THE INVENTION

The driving of poultry and animal feeding conveyors of the general type disclosed in said patent without changing the direction of travel of the chain by passing it around the sprocket (straight through or single tooth drive) is desirable, especially with side flexing chain, and has been done for several years but it has the following undesirable characteristics:

(1) A shorter pitch chain is required, which limits the strength and carrying capacity that can be designed into the chain;

(2) A larger diameter sprocket relative to the pitch of the chain is required, which, in turn, requires a slower sprocket speed and a higher torque to do a given amount of work. The slower speed requires a greater speed reduction, which increases the cost of the reducer. The higher torque requires larger parts in the reducer, which also increases the cost of the reducer. (Under these conditions a substantial increase in the pitch of the chain would increase the cost of the drive beyond the practical range);

(3) Unavoidable sliding of the driven chain link occurs on the sprocket tooth at the point of contact where the driving pressure is exerted. This causes a high friction loss, excess sprocket wear, and occasional bent or broken chain;

(4) Unavoidable high angle of contact occurs between the driving sprocket tooth and the driven chain link in relationship to the plane of the chain travel. This angular pressure has to be much greater than the required parallel pressure to do the same work. The increased angular pressure is exerted at the point of sliding contact as mentioned in No. 3; consequently, further increasing the friction loss and sprocket wear and, in turn, increasing the torque requirement and cost mentioned in No. 2.

To minimize the above characteristics, it has been necessary in the past to use a large ratio of sprocket diameter to chain pitch: A minimum of 4.6 to 1. My invention will reduce this minimum ratio to 2.1 to 1, making it possible, for the first time, to use a shorter sprocket radius or torque arm than the pitch of the chain in the single tooth driving of the chain.

A further object of my invention is to remove the above listed undesirable characteristics from the straight-through or single tooth drive, namely:

(1) To make long pitch chain practical because of the large reduction of ratio of sprocket diameter to chain pitch, consequently, raising the limit of strength and carrying capacity that can be designed into the chain.

(2) To make possible a much smaller sprocket diameter relative to the chain pitch because of the above-mentioned large ratio reduction.

(3) To completely eliminate the sliding of the driving sprocket tooth on the driven chain link by using a rolling contact point which eliminates all friction between the driving and driven parts.

(4) To greatly reduce the contact angle between the sprocket and the chain by using a novel combination of sprocket pitch, chain pitch, guide shoe shape and guide shoe location.

BRIEF DESCRIPTION OF DRAWINGS

In the accompanying drawings, I have illustrated examples of preferred forms of my invention and in these drawings:

FIGURE 1 is a view mainly in side elevation but partly in vertical section illustrating a vertical-type sprocket drive embodying this invention.

FIGURE 2 is a plan view of the drive of FIGURE 1 taken from the position indicated at line 2—2 of FIGURE 1.

FIGURE 3 is a side elevational view of a preferred form of sprocket used in the drive.

FIGURE 4 is a sectional view taken along line 4—4 of FIGURE 3.

FIGURES 5 to 7 are schematic side elevational views showing successive relative positions of the drive sprocket and driven chain.

FIGURE 8 is a top plan view, partly broken away, of a horizontal type sprocket drive embodying this invention.

FIGURE 9 is an edge view of the drive of FIGURE 8 taken from the position indicated at line 9—9 of FIGURE 8.

DETAILED DESCRIPTION OF DRAWINGS

Figure 10:
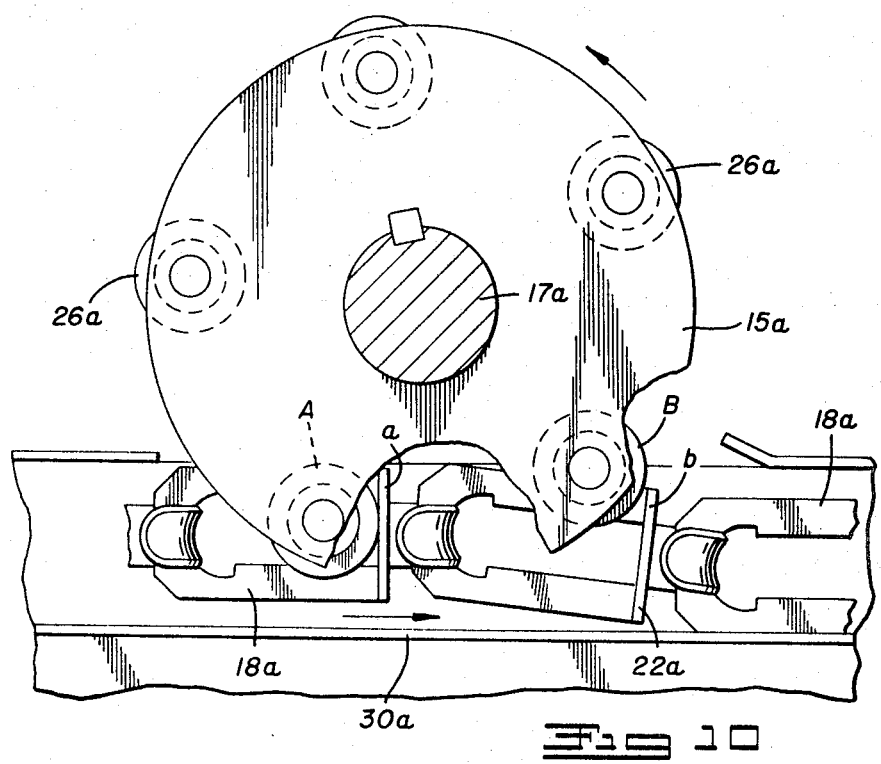
FIGURES 10 and 11 are schematic views illustrating relative drive positions, successive to that indicated in FIGURE 8, of the sprocket and chain.

Preferred examples of the sprocket drive of this invention are given in the drawings but many other examples could be provided. In each form of my invention, the chain passes in a straight line and the sprocket is disposed tangential thereto so that the chain does not pass around the sprocket. The sprocket does not have successive teeth for engaging the chain but has successive antifriction rollers at angularly spaced intervals around its periphery for engaging the chain successively with driving force. The sprocket may be vertically disposed in a plane normal to the plane of travel of the chain and engage the chain either at its upper or lower sides or it may be horizontally disposed in a plane common with the chain and engage the chain at one of its side edges. In either instance, the drive will be a straight-through drive by means of the successive contact rollers engaging successive links of the chain. In addition to the sprocket, the chain will be engaged by a pressure or bearing shoe at a location across the chain directly opposite the drive sprocket, whether the sprocket is vertical or horizontal, to prevent displacement of the chain, as a result of the drive pressure, and thereby to maintain efficient driving contact of the successive rollers and the chain.

In the example shown in FIGURES 1–7, the sprocket 15 is vertically disposed in a plane which is common to the longitudinal axis of the chain 16 which it engages. The sprocket is normal to the plane of the chain and is keyed to a shaft 17 which is disposed transversely of the chain at a higher level and which may be driven in a suitable manner. The chain is illustrated as being of the flexible open-link type disclosed in said copending application and comprising a series of links 18 which interlock with each other and are free to swing relatively in both horizontal and vertical planes and to twist about its longitudinal axis. Each link, as indicated in FIGURE 2, is provided with an opening 20, down into which the angularly spaced driving rollers 26, of the sprocket, will successively move and at one end of this opening is the hook-shaped barrel 22 which is the actual part engaged by the corresponding driving roller 26 of the sprocket.

Each sprocket 15 is illustrated in detail in FIGURES 3 and 4 and, in this example, is shown star-shaped with five radial support arms 23 at angularly spaced positions about a central hub 24. The outer ends of the arms 23 are bifurcated, as indicated at 25, and each bifurcation has a driving contact roller 26 disposed therein with each roller being of the antifriction type and mounted on a stub roller shaft 27 transversely disposed in the bifurcation. The rollers 26 are in a vertical plane common to a vertical plane passing through the longitudinal axis of the chain and the roller shafts 27 are transverse relative thereto. The rollers have contact peripheries substantially coincident with the outer extremities of the bifurcations but projecting laterally in both directions beyond the corresponding edges of such bifurcations. The bifurcations, at their leading edges, considering the direction of rotation of the sprocket, are provided with the notches 28 which make their extremities substantially sharp.

Beneath the path of travel of the chain, a pressure or bearing shoe 30 of elongated form is provided for resisting downward displacement of the chain links, as they are engaged by the successive rollers 26 of the sprocket. Each shoe is provided with a flat upper bearing surface 31 over which the chain links 18 slide, the links in the example shown being provided with the depending bearing feet 32 which actually engage the surface 31. In the flat surface 31, midway of the side edges thereof, an elongated upwardly opening groove 33 is provided and this groove preferably has a curved bottom side 34. The groove is so located and of such depth as to provide a recessed chamber for the rollers 26 to move down into as the sprocket 15 rotates and swings the arms 23 successively downwardly to move the rollers 26 through the chain link openings 20. This recess or slot, therefore, prevents interference between the ends of the arms 23, and the rollers 26 carried thereby, and the shoe 30. The recessed slot or groove 33 will tend to fill with feed material but the sharp notched ends 28 will dig into the material and will provide a leading flat surface which will swing down into the inlet end of the slot and serve to engage the material and push it along through the slot until it moves upwardly and outwardly out of the far end thereof.

The foot bearing portion 32 on each link is of such a transverse extent that it extends across and bridges the slot or groove 33. Thus, the chain links will slide along the flat surface 31 of the shoe with the bodies thereof elevated and spaced from that surface. The application of the driving pressure by the sprocket 15 to the chain is illustrated in FIGURES 5–7. In FIGURE 5, the roller indicated at A is just passing into the opening 20 of a link indicated at $a$ and just prior to entry of the roller into the groove 33 and the preceding roller at B, at this time, is still in engagement with the barrel 22 of the preceding link at $b$. At this time, the succeeding roller at A has not contacted the barrel of the succeeding link $a$. Thus, at this instant, in the rotation of the sprocket 15, there is a maximum angle of contact between roller at B and the cooperating barrel 22 of the preceding link $b$ before transfer of pressure by the roller at A to the barrel of the succeeding link $a$. In FIGURE 6, I have indicated the point of transfer, during rotation of the sprocket, of driving pressure from the leading link $b$ to the next succeeding or trailing link $a$. It will be apparent that as the roller B swings down into maximum angle of contact with the link $b$ (FIGURE 5), the downward pressure on the link tends to increase, before the roller starts to swing upwardly (FIGURE 6) out of the groove 33 and the opening 20 of the link. To overcome some of this downward pressure and to convert some of it into a forward or horizontal pushing pressure, the flat shoe surface 31 is provided with a transverse pocket 35 at the forward or exit end of the groove 33, as shown in FIGURE 2. This depressed pocket is of a transverse dimension greater than the bearing feet 32 of the chain links so that these bearing feet will successively drop into the pocket as they reach the exit end of the groove 33. The chain links are shown as also having flights 36 projecting from each side thereof but these are at a sufficiently high level so as not to interfere with the bearing feet 32 dropping into the pocket 35. After transfer of pressure to the succeeding link $a$, as indicated in FIGURE 7, the roller A continues to apply driving pressure thereto whereas the roller B swings upwardly out of contact with the link $b$. It will be noted that during driving contact of each roller 26 and its cooperating barrel 22, the roller 26 will turn about its axis 27 so that there will be a rolling contact, without relative slippage of surfaces, between the roller and the barrel. This will greatly reduce frictional pressure and make the chain easier to drive and less subject to wear.

Figure 11:
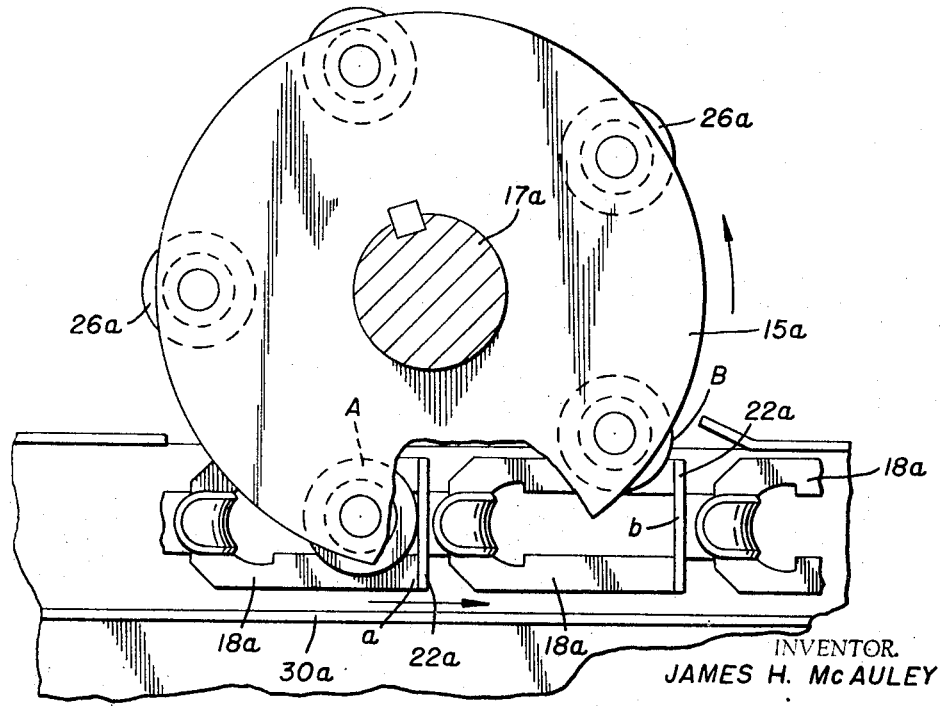

In FIGURES 8–11, the straight-through open chain link drive is by a sprocket 15$a$ horizontally disposed for rotation about a vertical axis 17$a$. The sprocket is shown as a disc with the rollers 26$a$ disposed at angularly spaced intervals and with their driving peripheries movable outwardly beyond the periphery of the disc. This arrangement is adapted to engage the side edge of a chain comprising the interlocking links 18$a$ which may be like the chain of the copending application Ser. No. 630,049. In FIGURE 8, the roller A has not yet applied pressure to the trailing link $a$ but the roller B has been and is applying it to the leading link $b$. In FIGURE 10, the point of transfer of driving pressure from the roller B and associated link $b$ to the roller A and associated link $a$, is indicated and then, as indicated in FIGURE 11, the pressure is continued by roller A contacting the link $a$. With this type of open-link chain, the pressure is applied by the rollers 26$a$ to the upstanding blades 22$a$ on the chain but the driving pressure may be applied by the succeeding rollers of sprockets to various portions of different types of chains according to this invention. As in the other form of my invention, the application of driving pressure by the sprocket to the chain will result in a radial force which will tend to flex the chain outwardly away from the sprocket. To resist this, a bearing shoe 30$a$ is provided for a substantial longitudinal extent opposite the sprocket and parallel to a line tangent thereto and the chain may flex into contact with this guide shoe and slide therealong.

It will be apparent from the above description that the sprocket with the antifriction rollers for engaging the chain and the opposed bearing shoe for resisting radial thrust on the flexible chain produced by the sprocket obtains all the objects and advantages set forth in the first part of this description. The objects and advantages are obtained in that type of chain installation where it is undesirable to pass the chain around the drive sprocket.

Having thus described this invention, what is claimed is:

1. In combination with a longitudinally extending, flexible chain having a plurality of links connected together for relative movement to permit flexing of the chain, a rotatable drive sprocket disposed in a plane substantially normal to the longitudinal axis of the chain at one side of the axis and engageable with the successive links of the chain to drive it in the direction of its longitudinal axis, antifriction link-contacting means carried by the sprocket at angularly spaced intervals, and a bearing shoe on the side of said longitudinal axis opposite said sprocket for engaging the chain to limit flexing created by radial thrust of the sprocket against the chain during its driving contact therewith; said antifriction means being rollers mounted on the sprocket for free rotation adapted to successively engage said links, said links being provided with openings for receiving said rollers successively to drive the chain, said bearing shoe being provided with a surface over which the chain slides and which has a longitudinally extending groove therein into which said rollers will move as they pass into said link openings.

2. The combination of claim 1 in which said rollers are carried on the outer ends of radial arms carried by said sprocket which will swing through said groove in the bearing shoe.

3. The combination of claim 2 in which each link has a laterally extending portion bridging the groove transversely, said groove being widened at its exit end to permit movement of said portion thereinto.

4. The combination of claim 3 in which said radial arms on said sprocket are provided with flat leading surfaces movable through said groove.

References Cited

UNITED STATES PATENTS

| | | | |
|---|---|---|---|
| 542,936 | 7/1895 | Moore | 74—243 |
| 618,642 | 1/1899 | Clouser | 74—243 |
| 1,335,076 | 3/1920 | Peasley. | |
| 3,262,548 | 7/1966 | McAuley | 198—173 |

RICHARD E. AEGERTER, *Primary Examiner.*